(12) United States Patent
Stack et al.

(10) Patent No.: US 10,518,636 B2
(45) Date of Patent: Dec. 31, 2019

(54) FUEL FILLER ASSEMBLY FOR A VEHICLE

(71) Applicant: GM GLOBAL TECHNOLOGY OPERATIONS LLC, Detroit, MI (US)

(72) Inventors: Matthew M. Stack, Macomb Township, MI (US); Gordan N. Noll, St. Clair Shores, MI (US); Brian R. Rusch, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 21 days.

(21) Appl. No.: 15/897,286

(22) Filed: Feb. 15, 2018

(65) Prior Publication Data

US 2019/0248232 A1 Aug. 15, 2019

(51) Int. Cl.
*B60K 15/04* (2006.01)
*B60L 11/18* (2006.01)
*B60L 53/16* (2019.01)
*B60K 15/05* (2006.01)

(52) U.S. Cl.
CPC .............. *B60K 15/04* (2013.01); *B60K 15/05* (2013.01); *B60L 53/16* (2019.02); *B60K 2015/047* (2013.01); *B60K 2015/0458* (2013.01); *B60K 2015/0553* (2013.01)

(58) Field of Classification Search
CPC ............ B60K 15/04; B60K 2015/0458; B60K 15/05; B60K 2015/0553; B60L 11/1818; B60L 53/16

USPC ........................................................ 296/97.22
See application file for complete search history.

(56) References Cited

U.S. PATENT DOCUMENTS

| | | | | |
|---|---|---|---|---|
| 7,549,694 B2 * | 6/2009 | Scott | ...................... | B60K 15/04 296/97.22 |
| 2013/0249234 A1 * | 9/2013 | Higgins | ................. | B60K 15/05 296/97.22 |
| 2015/0298542 A1 * | 10/2015 | Kim | ...................... | B60K 15/04 220/86.2 |

* cited by examiner

*Primary Examiner* — Joseph D. Pape
*Assistant Examiner* — Dana D Ivey

(57) ABSTRACT

An assembly according to the present disclosure includes a bezel having a first aperture therethrough. The bezel has a first face and a second face. The second face is provided with a plurality of retention loops. The assembly includes an elongate member disposed at least partially within the first aperture. The elongate member is generally fixedly positioned relative to the bezel. The assembly further includes a movable closeout feature having a second aperture therethrough. The elongate member is disposed at least partially within the second aperture. The movable closeout feature is provided with a plurality of tabs. Respective tabs of the plurality of tabs are disposed in corresponding respective loops of the plurality of retention loops. The movable closeout feature is repositionable relative to the bezel by contact with the elongate member.

17 Claims, 2 Drawing Sheets

FUEL FILLER ASSEMBLY FOR A VEHICLE

TECHNICAL FIELD

The present disclosure relates to an automotive vehicle, and more particularly to a refueling module for an automotive vehicle.

INTRODUCTION

Conventional gas-powered or diesel automotive vehicles are generally provided with a fuel cap and housing assembly. The fuel cap and housing assembly are mounted to a body structure of the vehicle. The fuel cap is provided to cover a fuel filler pipe which is fluidly coupled to a fuel tank. The fuel cap may be removed from the assembly and fuel may be dispensed into the fuel filler pipe for subsequent conveyance into the fuel tank.

Likewise, electric vehicles or plug-in hybrid electric vehicles are generally provided with a charging receptacle assembly. Such assemblies may be structurally similar to the fuel cap and housing assemblies of conventional vehicles; however, in place of a fuel filler pipe, an electric charging receptacle is provided. Such receptacles are configured to couple to an external power source, receive electric power from the external power source, and to convey the received electric power to a vehicle battery or other energy storage device.

SUMMARY

An assembly according to the present disclosure includes a bezel having a first aperture therethrough. The bezel has a first face and a second face. The second face is provided with a plurality of retention loops. The assembly includes an elongate member disposed at least partially within the first aperture. The elongate member is generally fixedly positioned relative to the bezel. The assembly further includes a movable closeout feature having a second aperture therethrough. The elongate member is disposed at least partially within the second aperture. The movable closeout feature is provided with a plurality of tabs. Respective tabs of the plurality of tabs are disposed in corresponding respective loops of the plurality of retention loops. The movable closeout feature is repositionable relative to the bezel by contact with the elongate member.

In an exemplary embodiment, the elongate member comprises a fuel filler pipe or electric charging receptacle.

In an exemplary embodiment, the closeout feature comprises an annular body having a body diameter, the first aperture has a first aperture diameter, and the second aperture has a second aperture diameter, the first aperture being greater than the second aperture diameter, the body diameter being greater than the first aperture diameter.

In an exemplary embodiment, the plurality of tabs comprise at least three tabs, and wherein the plurality of retention loops comprise at least three retention loops.

In an exemplary embodiment, the bezel comprises a first portion and a second portion, the first portion extending about the first aperture, the second portion extending about the first portion, the first portion having a distinct material composition from the second portion. In such embodiments, the second portion may have a higher elastic modulus than the first portion.

In an exemplary embodiment, the plurality of retention loops are integral with the second face.

An automotive vehicle according to the present includes a body having an exterior and an interior, and a housing. The housing is accessible from the exterior. The vehicle additionally includes a bezel coupled to the housing. The bezel has a first aperture therethrough and is provided with a first retention feature. The vehicle also includes a closeout member movably coupled to the bezel. The closeout member has a second aperture therethrough and is provided with a second retention feature. The second retention feature is movably engaged with the first retention feature such that the closeout member may move in translation relative to the bezel. The vehicle further includes an elongate member disposed at least partially within the first aperture and the second aperture.

In an exemplary embodiment, the first retention feature comprises a plurality of retention loops and the second retention feature comprises a plurality of tabs, with respective tabs of the plurality of tabs being disposed in corresponding respective loops of the plurality of retention loops. In such embodiments, the closeout member may comprise an annular body having a periphery, with the plurality of tabs being disposed about the periphery.

In an exemplary embodiment, the closeout member comprises an annular body having a body diameter, the first aperture has a first aperture diameter, and the second aperture has a second aperture diameter. The first aperture is greater than the second aperture diameter, and the body diameter is greater than the first aperture diameter.

In an exemplary embodiment, the elongate member comprises a fuel filler pipe or electric charging receptacle.

In an exemplary embodiment, the bezel comprises a first portion and a second portion, the first portion extending about the first aperture, the second portion extending about the first portion, the first portion having a distinct material composition from the second portion. The second portion may have a higher elastic modulus than the first portion.

In an exemplary embodiment, the bezel is integral with the housing.

Embodiments according to the present disclosure provide a number of advantages. For example, the present disclosure provides a robust refueling assembly which may accommodate manufacturing deviations while still providing an aesthetically pleasing final assembly.

The above advantage and other advantages and features of the present disclosure will be apparent from the following detailed description of the preferred embodiments when taken in connection with the accompanying drawings.

DETAILED DESCRIPTION

Figure 1:
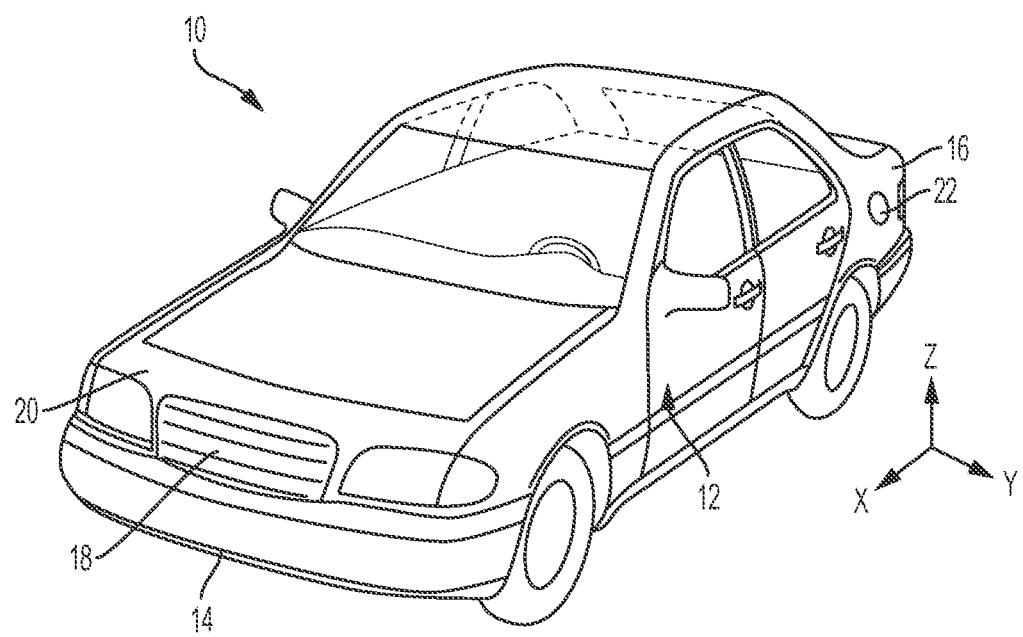
FIG. 1 is an isometric view of a vehicle assembly according to an embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Fuel filler pipes for automotive vehicles may have a first end coupled to a fuel tank and a second end proximate a housing assembly at the exterior of the vehicle. The housing assembly may include a fuel cap, capless inlet assembly, or other pipe sealing arrangement. Fuel filler pipes may have relatively complex geometry to route fuel from the housing assembly to the fuel tank, while accommodating intervening internal structure or other components. As a result, fuel filler pipes used in known assemblies must be manufactured to relatively stringent tolerances to ensure proper alignment with the housing assembly and to the fuel tank while maintaining the desired geometry therebetween. In such known assemblies, manufacturing deviations from the desired fuel filler pipe design may result in a misalignment of the fuel filler pipe and the housing assembly. Such misalignments may require rework or result in undesirable visual effects such as gapping.

Referring now to FIGS. 1 through 4, an automotive vehicle 10 according to an embodiment of the present disclosure is illustrated. The vehicle 10 has a body 12 which may enclose a passenger compartment. Generally, one or more occupants can be disposed in the passenger compartment. The passenger compartment may be provided with one or more doors that open and close to allow the occupants to enter and exit the vehicle 10. The body 12 includes a fore portion 14 and an aft portion 16, with a plurality of fascia pieces or panels, some or all of which are visible from the outside of the passenger compartment of the vehicle 10. The fore and aft portions 14, 16 are spaced from each other along a longitudinal direction x of the vehicle 10. The sides of the vehicle 10 are spaced from each other in a lateral direction y. The lateral direction y is transverse or perpendicular to the longitudinal direction x of the vehicle 10. The top and bottom of the vehicle 10 are spaced from each other in a vertical direction z. The vertical direction z is transverse or perpendicular to the longitudinal direction x and the lateral direction y of the vehicle 10.

Generally, the fascia pieces or panels surround the vehicle 10. The fascia pieces or panels include a front fascia 20 surrounding a grille 18, and may also include a rear panel which can include a rear fascia, and side panel(s) which can include front quarter panel fascia(s) and rear quarter panel fascia(s). Generally, the front fascia 20 is disposed along the fore portion 14 of the vehicle 10, and the rear fascia is disposed along the aft portion 16 of the vehicle 10. The front quarter panel fascia(s) can be disposed adjacent to the front fascia and the rear quarter panel fascia(s) can be disposed adjacent to the rear fascia.

The body 12 is provided with a closure panel 22. In embodiments where the vehicle 10 is a conventional fuel-powered vehicle, the closure panel 22 may be referred to as a fuel door. In embodiments where the vehicle 10 is an electric vehicle (EV) or plug-in hybrid electric vehicle (PHEV), the closure panel 22 may be referred to as a charger port door. The closure panel 22 is a movable panel configured to selectively permit access to a fuel filler pipe or charging port of the vehicle 10. When closed, the closure panel 22 is generally flush with the body 12. In the embodiment illustrated in FIG. 1 the closure panel 22 is provided at a rear quarter panel fascia proximate the aft portion 16 of the vehicle 10; however, in other embodiments the closure panel 22 may be provided at other locations on the vehicle as appropriate.

Figure 2:
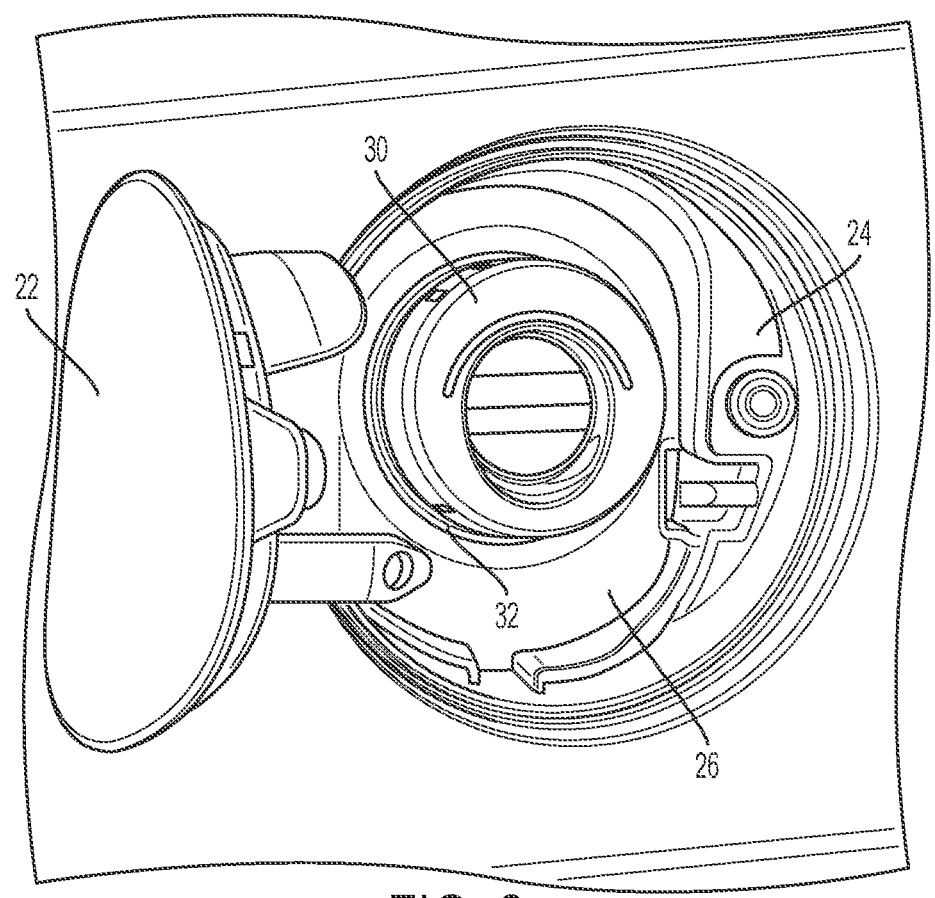
FIG. 2 is an exterior view of a closeout assembly for a fuel filler pipe according to an embodiment of the present disclosure.
Figure 3:
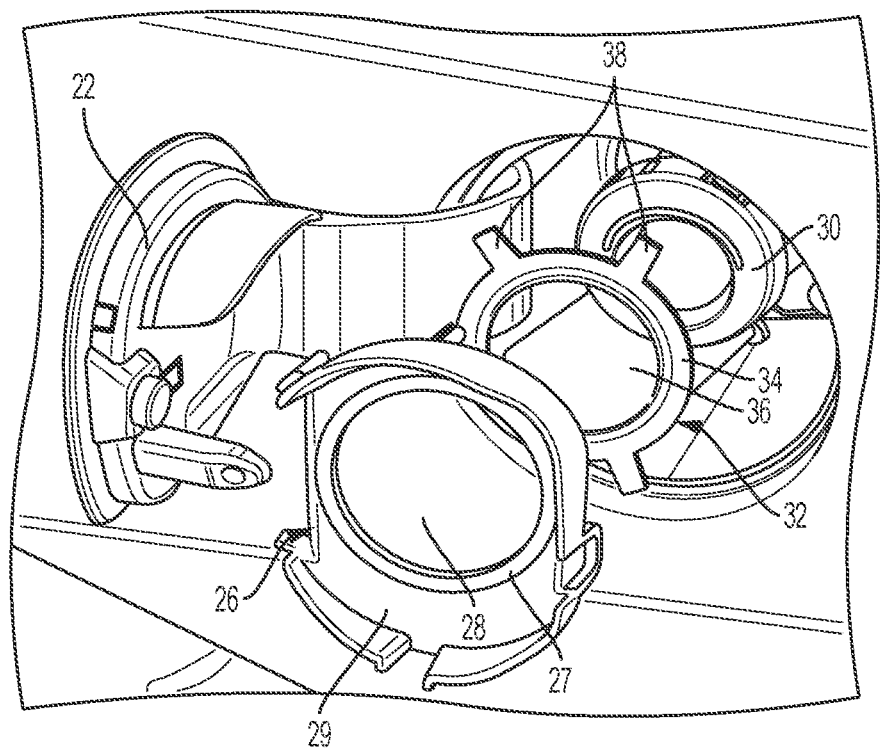
FIG. 3 is an exploded view of a closeout assembly for a fuel filler pipe according to an embodiment of the present disclosure.
Figure 4:
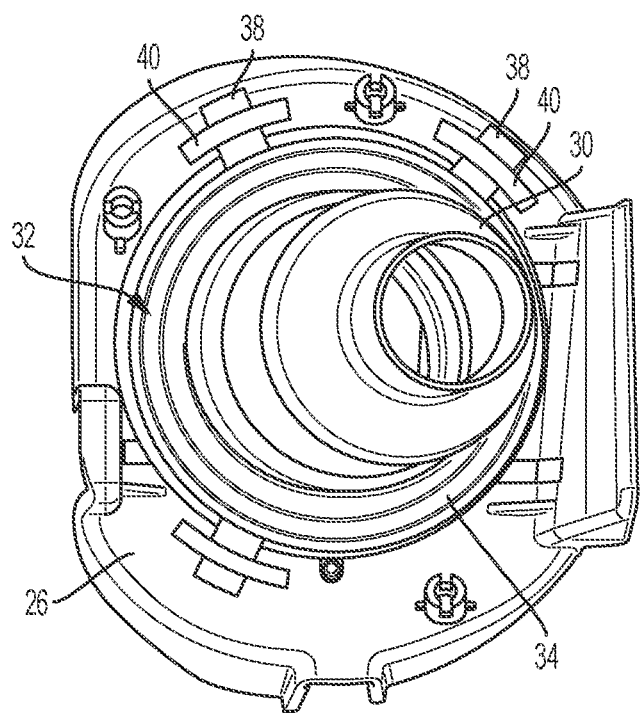
FIG. 4 is an interior view of a closeout assembly for a fuel filler pipe according to an embodiment of the present disclosure.

Referring now to FIGS. 2 through 4, the closure panel 22 and associated components are illustrated in further detail. In FIG. 2, the closure panel 22 is illustrated in an open position. A housing 24 is disposed under the closure panel 22. The housing 24 is recessed into the body 12 of the vehicle 10, e.g. coupled to an opening in a rear quarter panel fascia.

The housing 24 is provided with a bezel 26. The bezel 26 may be integrated into the housing 24, or may be a separable component. The bezel 26 is provided with a first aperture 28 therethrough. The bezel 26 may be formed of a single material, e.g. a rigid plastic material, or may be formed of multiple materials, e.g. formed by a two-shot molding process. In the illustrated embodiment, the bezel 26 has an inner portion 27 about the first aperture 28 formed of a soft-shot material, while the remainder 29 is formed of a hard-shot material.

A closeout member 32, which may be referred to as a grommet, is movably coupled to the bezel 26. The closeout member 32 has a generally annular body 34 with a second aperture 36 extending therethrough. In the illustrated embodiment, the closeout member 32 is provided with a plurality of tabs 38 extending from a periphery of the body 34. The tabs 38 are retained by retention features 40 coupled to the bezel 26. In the illustrated embodiment the retention features 40 comprise a plurality of retention loops, with each tab 38 being secured by a corresponding retention loop. However, in other embodiments, the retention features 40 may have different configurations, e.g. slots through the bezel 26 within which the tabs 38 are retained.

The closeout member 32 is preferably movable in two dimensions relative to the bezel 26, e.g. within a general plane defined by the first aperture 28 and the second aperture 36. In the illustrated embodiment, the retention features 40 have apertures with diameters exceeding the width of the tabs 38, thereby permitting the tabs 38 to move in translation or rotation relative to the retention features 40.

An elongate member 30 extends through the first aperture 28 and the second aperture 36. In the illustrated embodiment the elongate member 30 is a fuel pipe for receiving gasoline, diesel, or other fuel, and for conveying such fuel to a fuel tank. However, in embodiments wherein the vehicle 10 is an EV or PHEV, the elongate member may comprise a charging receptacle for receiving electrical power from an external power supply.

In the illustrated embodiment, the diameter of the second aperture 36 is approximately equal to the outer diameter of the elongate member 30. The closeout member 32 may thereby fit closely to the elongate member 30. The diameter of the first aperture 28 exceeds the diameter of the second aperture 36, but is less than the outer diameter of the body 34. The closeout member 32 thereby closes any space between the periphery of the first aperture 28 and the elongate member 30.

Advantageously, the closeout member 32 may thereby accommodate a plurality of relative positions between the elongate member 30 and the bezel 26 while providing a visually satisfactory appearance, e.g. with no visually-apparent gaps between the bezel 26 and the elongate member 30. The assembly is therefore more robust with respect to deviations in positioning of the elongate member 30 relative to the body 12. Moreover, this benefit is achieved without requiring additional assembly or rework during the manufacturing process.

While the above has been described largely in the context of fuel filler or charger assemblies, other embodiments are contemplated within the scope of the present disclosure. As non-limiting examples, other embodiments may be used to provide robust closeout assemblies around other types of elongate members utilized in other automotive implementations or non-automotive implementations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An assembly comprising:
   a bezel having a first aperture therethrough, the bezel having a first face and a second face, the second face being provided with a plurality of retention loops having respective internal diameters;
   an elongate member disposed at least partially within the first aperture, the elongate member being generally fixedly positioned relative to the bezel; and
   a movable closeout feature having a second aperture therethrough, the elongate member being disposed at least partially within the second aperture, the movable closeout feature being provided with a plurality of tabs having respective widths, respective tabs of the plurality of tabs being disposed in corresponding respective loops of the plurality of retention loops to couple the moveable closeout feature to the bezel, wherein the respective internal diameters exceed the respective widths to enable relative motion between the closeout feature and the bezel.

2. The assembly of claim 1, wherein the elongate member comprises a fuel filler pipe or electric charging receptacle.

3. The assembly of claim 1, wherein the closeout feature comprises an annular body having a body diameter, the first aperture has a first aperture diameter, and the second aperture has a second aperture diameter, the first aperture diameter being greater than the second aperture diameter, the body diameter being greater than the first aperture diameter.

4. The assembly of claim 1, wherein the plurality of tabs comprise at least three tabs, and wherein the plurality of retention loops comprise at least three retention loops.

5. The assembly of claim 1, wherein the bezel comprises a first portion and a second portion, the first portion extending about the first aperture, the second portion extending about the first portion, the first portion having a distinct material composition from the second portion.

6. The assembly of claim 5, wherein the second portion has a higher elastic modulus than the first portion.

7. The assembly of claim 1, wherein the plurality of retention loops are integral with the second face.

8. The assembly of claim 1, wherein the plurality of tabs forms a unitary piece with the movable closeout feature.

9. The assembly of claim 1, wherein the plurality of tabs extends radially outward from the periphery of the movable closeout feature.

10. An automotive vehicle comprising:
    a body having an exterior and an interior;
    a housing coupled to the body, the housing being accessible from the exterior;
    a bezel coupled to the housing, the bezel having a first aperture therethrough and being provided with a first retention feature;
    a closeout member movably coupled to the bezel, the closeout member having a second aperture therethrough and being provided with a second retention feature, the second retention feature being engaged with the first retention feature; and
    an elongate member disposed at least partially within the first aperture and the second aperture; wherein the engagement between the first retention feature and the second retention feature provides a translatable interface between the bezel and the closeout member.

11. The automotive vehicle of claim 10, wherein the first retention feature comprises a plurality of retention loops and wherein the second retention feature comprises a plurality of tabs, respective tabs of the plurality of tabs being disposed in corresponding respective loops of the plurality of retention loops.

12. The automotive vehicle of claim 11, wherein the closeout member comprises an annular body having a periphery, the plurality of tabs being disposed about the periphery.

13. The automotive vehicle of claim 10, wherein the closeout member comprises an annular body having a body diameter, the first aperture has a first aperture diameter, and the second aperture has a second aperture diameter, the first aperture diameter being greater than the second aperture diameter, the body diameter being greater than the first aperture diameter.

14. The automotive vehicle of claim 10, wherein the elongate member comprises a fuel filler pipe or electric charging receptacle.

15. The automotive vehicle of claim 10, wherein the bezel comprises a first portion and a second portion, the first portion extending about the first aperture, the second portion extending about the first portion, the first portion having a distinct material composition from the second portion.

16. The automotive vehicle of claim 15, wherein the second portion has a higher elastic modulus than the first portion.

17. The automotive vehicle of claim 10, wherein the bezel is integral with the housing.

\* \* \* \* \*